US011799610B2

United States Patent
Li et al.

(10) Patent No.: US 11,799,610 B2
(45) Date of Patent: Oct. 24, 2023

(54) METHOD AND APPARATUS FOR ALLOCATING PUCCH RESOURCES TO HARQ-ACK AND CSI TRANSMISSIONS

(71) Applicant: LENOVO (BEIJING) LIMITED, Beijing (CN)

(72) Inventors: Hongchao Li, Beijing (CN); Lianhai Wu, Beijing (CN); Hongmei Liu, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 106 days.

(21) Appl. No.: 17/045,138

(22) PCT Filed: Apr. 6, 2018

(86) PCT No.: PCT/CN2018/082093
§ 371 (c)(1),
(2) Date: Oct. 2, 2020

(87) PCT Pub. No.: WO2019/192017
PCT Pub. Date: Oct. 10, 2019

(65) Prior Publication Data
US 2021/0152317 A1    May 20, 2021

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01); *H04L 5/0062* (2013.01)

(58) Field of Classification Search
CPC ... H04L 5/0055; H04L 1/1861; H04L 1/1812; H04L 5/0062; H04L 1/1671; H04L 5/0057

(Continued)

(56) References Cited

U.S. PATENT DOCUMENTS

2014/0003452 A1*   1/2014   Han ................. H04L 1/1657
                                                    370/474
2017/0041923 A1    2/2017   Park
(Continued)

FOREIGN PATENT DOCUMENTS

WO    2014002286 A1    1/2014
WO    2018059160 A1    4/2018

OTHER PUBLICATIONS

U.S. Appl. No. 62/631,280, filed Feb. 15, 2018.*
(Continued)

*Primary Examiner* — Mang Hang Yeung
(74) *Attorney, Agent, or Firm* — Kunzler Bean & Adamson

(57) ABSTRACT

The present disclosure is directed to a method and apparatus for allocating PUCCH resource for HARQ-ACK and CSI transmission. According to an embodiment of the present disclosure, a method includes determining whether a HARQ-ACK transmission overlaps with a CSI transmission in time domain; in response to the HARQ-ACK transmission overlapping with the CSI transmission in the time domain, determining whether the sum of the UCI bits for the HARQ-ACK transmission and the UCI bits for the CSI transmission is within a UCI payload threshold supported by at least a PUCCH resource or at least a PUCCH resource set configured for the HARQ-ACK transmission; and allocating a PUCCH resource to the HARQ-ACK transmission and the CSI transmission based on whether the sum of the UCI bits for the HARQ-ACK transmission and the UCI bits for the CSI transmission is within the UCI payload threshold supported by the at least one PUCCH resource or at least one PUCCH resource sets.

18 Claims, 3 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0019853 A1 | 1/2018 | Aiba et al. | |
| 2020/0337046 A1* | 10/2020 | Gao | H04L 1/1819 |
| 2020/0404692 A1* | 12/2020 | Yin | H04W 72/1284 |

OTHER PUBLICATIONS

Ericsson, "On UCI Multiplexing on PUCCH", R1-1802906, Feb. 26-Mar. 2, 2018. (From Applicant's IDS) (Year: 2018).*

CATT, "Multiplexing of UCI transmissions of different durations or configurations", R1- 1801731, Center for Advanced Technology in Telecommunications, 3GPP TSG RAN WG1 Meeting #92, Feb. 26-Mar. 2, 2018, pp. 1-9.

Ericsson, "On UCI Multiplexing on PUCCH", R1-1802906, Telefonaktiebolaget L M Ericsson, 3GPP TSG RAN WG1 Meeting#92, Feb. 26-Mar. 2, 2018, pp. 1-8.

PCT/CN2018/082093, "International Search Report and the Written Opinion of the International Search Authority" ISA/CN, State Intellectual Property Office of the P.R. China, Sep. 19, 2018, pp. 1-7.

* cited by examiner

METHOD AND APPARATUS FOR ALLOCATING PUCCH RESOURCES TO HARQ-ACK AND CSI TRANSMISSIONS

TECHNICAL FIELD

Embodiments of the present disclosure is directed to wireless communication technology, and more specifically relates to the technology about physical uplink control channel (PUCCH) resource allocation for hybrid automatic repeat request-acknowledge (HARQ-ACK) and channel state information (CSI) transmissions.

BACKGROUND

As wireless communication technology develops, flexible physical uplink control channel (PUCCH) resource allocation has been introduced into 5G wireless communication technology. For example, PUCCH format 0 and 2 transmission may start from any one of symbol 0-13, while PUCCH format 1, 3 and 4 transmission may start from any one of symbol 0-11.

However, the flexible PUCCH resource allocation may result that HARQ-ACK transmission and a CSI transmission overlap with each other in time domain. When an originally determined PUCCH resources for the HARQ-ACK transmission, indicated by downlink control information (DCI) and remote resource control (RRC), are not capable to accommodate all the UCI bits for the HARQ-ACK transmission and CSI transmission, user equipment (UE) behaviors on how to handle the HARQ-ACK and the CSI transmissions multiplexing on the PUCCH resource need to be specified in new radio (NR) and Long Term Evolution (LTE)/LTE-A.

SUMMARY OF THE PRESENT DISCLOSURE

An object of the embodiments of the present disclosure is to provide a technical solution for multiplexing HARQ-ACK and CSI transmissions on PUCCH resources. Embodiments of the present disclosure provide a method and apparatus for allocating PUCCH resource for HARQ-ACK and CSI transmission.

According to an embodiment of the present disclosure, a method includes: determining whether a HARQ-ACK transmission overlaps with a CSI transmission in time domain; in response to that the HARQ-ACK transmission overlaps with the CSI transmission in the time domain, determining whether the sum of the uplink control information (UCI) bits for the HARQ-ACK transmission and the UCI bits for the CSI transmission is within a UCI payload threshold supported by at least a PUCCH resource or at least a PUCCH resource set configured for the HARQ-ACK transmission; and allocating a PUCCH resource to the HARQ-ACK and the CSI transmissions based on whether the sum of the UCI bits for the HARQ-ACK transmission and the UCI bits for the CSI transmission is within the UCI payload threshold supported by the at least one PUCCH resource or at least one PUCCH resource set.

In an embodiment of the present disclosure, determining whether the HARQ-ACK transmission overlaps with the CSI transmission in the time domain may further include determining whether the HARQ-ACK transmission and the CSI transmission have the same starting position in the time domain. The UCI payload threshold may be the maximum of UCI payload ranges supported by the at least one PUCCH resource or at least one PUCCH resource set configured for the HARQ-ACK transmission.

According to an embodiment of the present disclosure, the PUCCH resource allocated to the HARQ-ACK transmission and the CSI transmission may be an original PUCCH resource configured for the CSI transmission in response to that the sum of the UCI bits for the HARQ-ACK transmission and the UCI bits for the CSI transmission exceeds the UCI payload threshold supported by the at least one PUCCH resource or at least one PUCCH resource set. The method may further include mapping the UCI bits for the HARQ-ACK transmission and the UCI bits for the CSI transmission to the original PUCCH resource configured for the CSI transmission based on a predefined priority order. Wherein mapping the UCI bits for the HARQ-ACK transmission and the UCI bits for the CSI transmission to the original PUCCH resource configured for the CSI transmission may further include dropping UCI bits with a first priority in response to that the original PUCCH resource is fully mapped by the UCI bits with a second priority higher than the first priority. The original PUCCH resource configured for the CSI transmission may be determined based on RRC configuration.

According to another embodiment of the present disclosure, the PUCCH resource allocated to the HARQ-ACK transmission and the CSI transmission may be a reconfigured PUCCH resource in response to that the sum of the UCI bits for the HARQ-ACK transmission and the UCI bits for the CSI transmission exceeds the UCI payload threshold supported by the at least one PUCCH resource or at least one PUCCH resource set. The reconfigured PUCCH resource has parameters derived from at least two of PUCCH RRC configuration for HARQ-ACK, PUCCH resource RRC configuration for CSI report, and DCI. The format of the reconfigured PUCCH resource is determined based on the parameters from at least one of the PUCCH resource RRC configuration for HARQ-ACK, PUCCH resource RRC configuration for CSI report, and the DCI. The method may further include mapping the UCI bits for the HARQ-ACK transmission and the UCI bits for the CSI transmission to the reconfigured PUCCH resource.

In an embodiment of the present disclosure, the at least one PUCCH resource or at least one PUCCH resource set configured for the HARQ-ACK transmission may be determined based on DCI and RRC configuration.

According an embodiment of the present disclosure, the method may further include in response to that the sum of the UCI bits for the HARQ-ACK transmission and the UCI bits for the CSI transmission is within the UCI payload threshold, mapping the UCI bits for the HARQ-ACK transmission and the UCI bits for the CSI transmission to the original PUCCH resource configured for the HARQ-ACK transmission.

According to an embodiment of the present disclosure, in response to that the HARQ-ACK transmission and the CSI transmission are overlapped and have different starting positions in the time domain, the allocated PUCCH resource may be the original PUCCH resource configured for the later one of the HARQ-ACK transmission and the CSI transmission.

Embodiments of the present disclosure also provide an apparatus includes at least one processor and at least one memory having computer program codes stored therein. The at least one memory and the computer program codes are configured to, with the at least one processor, cause the apparatus to perform a method, for example, any one of the methods as stated above. For example, the at least one memory and the computer program codes are configured to, with the at least one processor, cause the apparatus to perform: determining whether a HARQ-ACK transmission overlaps with a CSI transmission in time domain; in response to that the HARQ-ACK transmission overlaps with the CSI transmission in the time domain, determining whether the sum of the UCI bits for the HARQ-ACK transmission and the UCI bits for the CSI transmission is within a UCI payload threshold supported by at least one PUCCH resource or at least one PUCCH resource set configured for the HARQ-ACK transmission; and allocating a PUCCH resource to the HARQ-ACK transmission and the CSI transmission based on whether the sum of the UCI bits for the HARQ-ACK transmission and the UCI bits for the CSI transmission is within the UCI payload threshold supported by the at least one PUCCH resource or at least one PUCCH resource set.

Embodiments of the present disclosure also provide a non-transitory, computer-readable storage medium having computer programmable instructions stored therein, wherein the computer programmable instructions are programmed to implement a method, for example any one of the methods as stated above.

Embodiments of the present disclosure solve the technical problem concerning allocating PUCCH resources for HARQ-ACK and CSI transmissions, which will greatly facilitate the evolution of the New Radio wireless communication technology.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only example embodiments of the present disclosure and are not therefore to be considered to be limiting of its scope. In addition, please note that steps shown in the drawings are only used to clearly illustrate the embodiments of the present disclosure, but not for limiting the sequence of the steps unless they are inevitable for persons skilled in the art.

DETAILED DESCRIPTION

Figure 1:
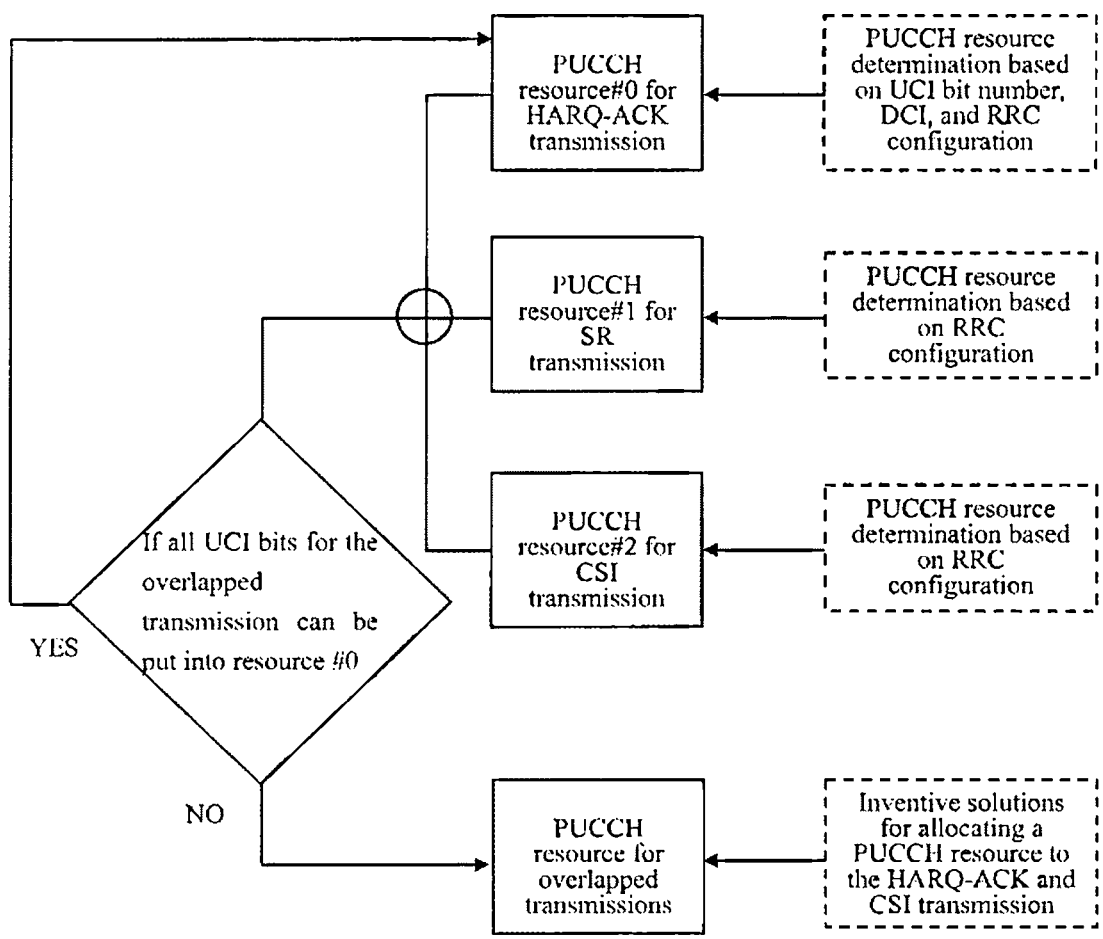
FIG. 1 illustrates an application scenario involving a HARQ-ACK transmission, scheduling request (SR) transmission and/or CSI transmission in PUCCH resources in the time domain according to an embodiment of the present disclosure.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In the case that an user equipment can flexibly configure PUCCH resources, a PUCCH resource carrying a HARQ-ACK transmission may overlap with a PUCCH resource carrying a CSI transmission, that is, the HARQ-ACK transmission and CSI transmission in PUCCH collide or conflict with each other in the time domain. Thus, that is one objective of the work item on 3GPP (3rd Generation Partnership Project) to solve the overlapped transmission of HARQ-ACK and CSI on a PUCCH resource.

Embodiments of the present disclosure provide solutions concerning allocating PUCCH resources for HARQ-ACK and CSI transmissions, which are capable of solving the technical problem concerning full or partial overlapping between the PUCCH resources carrying HARQ-ACK and CSI transmission respectively.

According to an embodiment of the present disclosure, the basic stages of a method for allocating PUCCH resources for HARQ-ACK and CSI transmissions may be summarized as: determining whether a HARQ-ACK transmission overlaps with a CSI transmission in time domain; in response to the HARQ-ACK transmission overlapping with the CSI transmission in the time domain, determining whether the sum of the UCI bits for the HARQ-ACK transmission and the UCI bits for the CSI transmission, is within a UCI payload threshold supported by at least PUCCH resource or at least one PUCCH resource set configured for the HARQ-ACK transmission; and allocating a PUCCH resource for the HARQ-ACK transmission and the CSI transmission based on whether the sum of the UCI bits for the HARQ-ACK transmission and the UCI bits for the CSI transmission exceeds the UCI payload threshold supported by at least one PUCCH resource or at least one resource set. The UCI payload threshold may be a maximum of UCI payload ranges supported by the at least one PUCCH resource or at least one PUCCH resource set configured for the HARQ-ACK transmission in an embodiment of the present disclosure. According to an embodiment of the present disclosure, determination as to whether the HARQ-ACK transmission overlaps with the CSI transmission in the time domain may be made based on whether the HARQ-ACK transmission and the CSI transmission have the same starting position in the time domain.

According to another embodiment of the present disclosure, an apparatus for allocating PUCCH resources for HARQ-ACK and CSI transmissions may include a processor and at least one memory including computer executable instructions stored therein. The at least one memory and the computer executable instructions stored thereon are configured to, with the at least one processor, to cause the apparatus to perform a method for allocating PUCCH resources for HARQ-ACK and CSI transmissions. For example, the at least one memory and the computer executable instructions are configured to, with the at least one processor, to cause the apparatus to perform a method for determining whether a HARQ-ACK transmission overlaps with a CSI transmission in time domain and in response to the HARQ-ACK transmission determined to overlap with the CSI transmission in the time domain, determining whether the sum of the UCI bits for the HARQ-ACK transmission and the UCI bits for the CSI transmission is within a UCI payload threshold supported by at least one PUCCH resource or at least one PUCCH resource set configured for the HARQ-ACK transmission; and allocating a PUCCH resource for the HARQ-ACK and the CSI transmissions based on whether the sum of the UCI bits for the HARQ-ACK transmission and the UCI bits for the CSI transmission exceeds the UCI payload threshold supported by at least one PUCCH resource or at least one PUCCH resource set.

More details on the embodiments of the present disclosure will be illustrated in the following text in combination with the appended drawings.

FIG. 1 illustrates an application scenario involving HARQ-ACK transmissions, scheduling request (SR) transmissions and/or CSI transmissions in PUCCH resources in the time domain according to an embodiment of the present disclosure.

As shown in FIG. 1, in an embodiment of the present disclosure, each UE is configured with at least one PUCCH resource or at least one PUCCH resource set for the HARQ-ACK transmissions, which is indicated to the UE via DCI and RRC configuration. Each PUCCH resource or PUCCH resource set has a UCI payload range, which defines a range of the UCI bits supported by the PUCCH resource or PUCCH resource set.

More specifically, each PUCCH resource set is further configured to include at least one PUCCH resource. Each PUCCH resource is identified by PUCCH-resource-index defined by high layer parameters, and is further defined with descriptions by PUCCH-resource-config-PF0, PUCCH-resource-config-PF1, PUCCH-resource-config-PF2, PUCCH-resource-config-PF3, or PUCCH-resource-config-PF4. Each description describes a PUCCH resource for PUCCH format 0, 1, 2, 3, or 4 respectively. An exhaustive set of the higher layer parameters for a PUCCH resource may include: an index of first symbol, a number of symbols, an index of the first physical resource block (PRB) prior of frequency hopping, an index of the first PRB after frequency hopping, a number of PRBs (for PUCCH format 2 or 3), frequency hopping, an index of the cyclic shift (for PUCCH format 0 or 1), an index of an orthogonal cover code in case of PUCCH format 1, an index of an orthogonal cover code in case of PUCCH format 4, a length for an orthogonal cover code in case of PUCCH format 4, a spatial setting by higher layer parameter PUCCH-Spatialrelationinfo. The format of a PUCCH resource may use a subset of exhaustive set of the higher layer parameters.

In addition, depending on how many PUCCH resources are in a PUCCH resource set, the PUCCH resources within the PUCCH resource set are determined as follow: for a PUCCH resource set with a UCI payload rang of more than 2 UCI bits, 8 PUCCH resources are configured. 3-bit assignment resource indicator (ARI) in DCI format 1_0 and format DCI 1_1 may be used to explicitly indicate the resource index. The same rule may be applied to another PUCCH resource set configured with 8 PUCCH resources, while another PUCCH resource set may be with a UCI payload range of 1 or 2 bits. In the case, for example, when more than 8 PUCCH resources (up to 32) are configured for a PUCCH resource set with a UCI payload range of 1 or 2 bits, control channel element (CCE) index based on implicit mapping may be additionally employed together with 3-bit ARI.

In the case that an UE intends to allocate one PUCCH resource to a HARQ-ACK transmission, it may select the PUCCH resource from the configured PUCCH resource sets based on the UCI bit number for the HARQ-ACK transmission and the UCI payload range of the PUCCH resource. For example, after acquiring all the PUCCH resource configurations, the UE may firstly select the PUCCH resource set based on the UCI payload range. After that, the format of the PUCCH resource is determined based on the UCI bit number for the HARQ-ACK transmission, PUCCH transmission duration and the parameters in the configuration corresponding to the selected PUCCH resource index. For example, according to an embodiment of the present disclosure, the UE selects PUCCH resource #0 for the HARQ-ACK transmission.

As shown in FIG. 1, the PUCCH resource configured for the SR transmission and CSI transmission respectively may be indicated to the UE via RRC configuration. That is, the UE allocates or determines the PUCCH resource for the SR transmission and CSI transmission based on the RRC configuration. For example, according to an embodiment of the present disclosure, the UE is configured with PUCCH resource #1 for the SR transmission and is configured with PUCCH resource #2 for the CSI transmission.

However, one of the HARQ-ACK transmission, SR transmission and CSI transmission may overlap with the other one or two in the time domain. For example, the HARQ-ACK transmission and CSI may have the same starting position in the time domain. Accordingly, inventive solutions for allocating a PUCCH resource to the HARQ-ACK and CSI transmission are needed.

Figure 2:
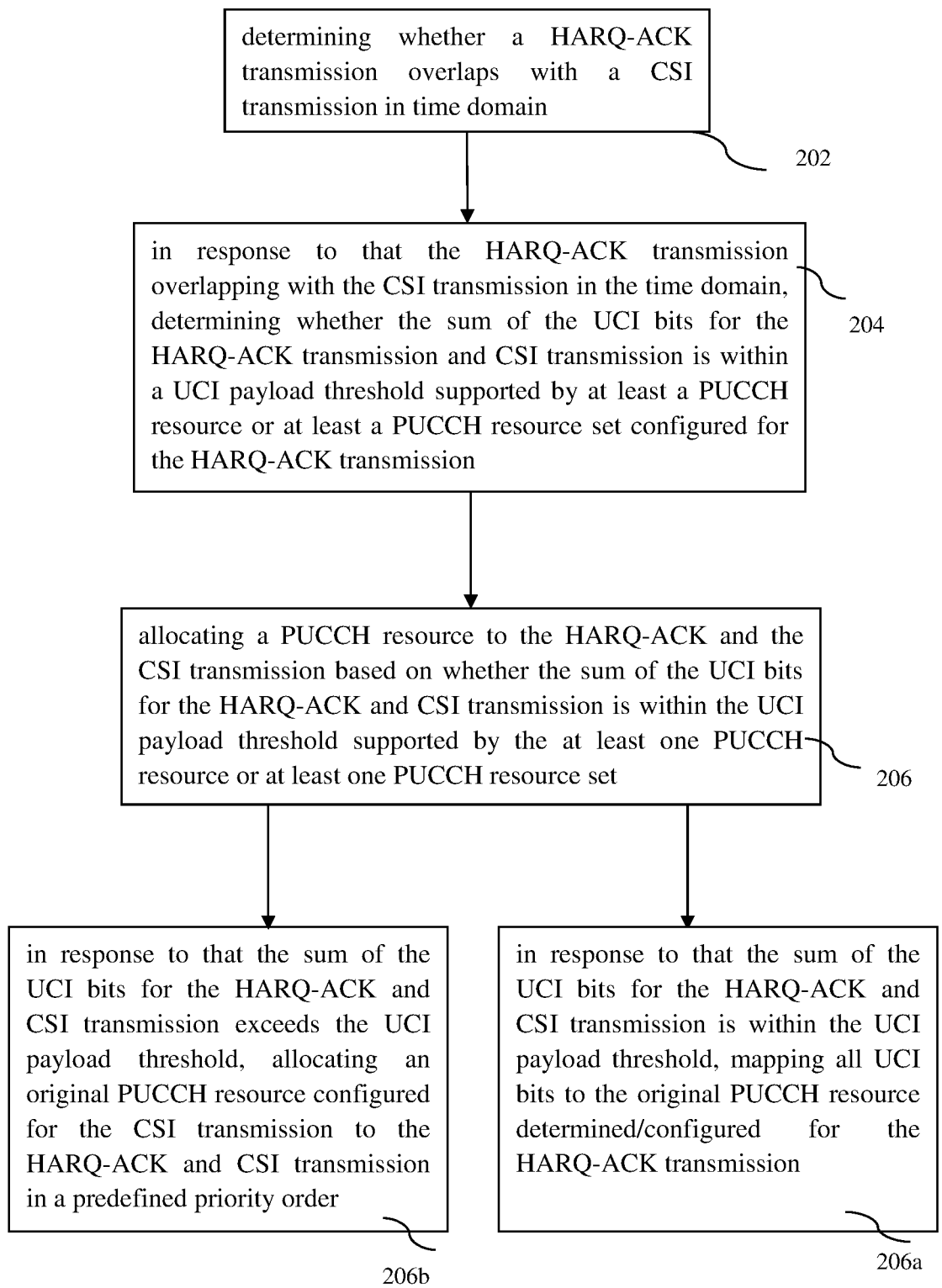
FIG. 2 is a flow chart illustrating a method for allocating a PUCCH resource to a HARQ-ACK and CSI transmission according to an embodiment of the present disclosure.

FIG. 2 is a flow chart illustrating a method for allocating a PUCCH resource to a HARQ-ACK and CSI transmission according to an embodiment of the present disclosure, which can be applied in the application scenario shown in FIG. 1.

According to an embodiment of the present disclosure, a method for allocating a PUCCH resource to a HARQ-ACK and CSI transmission may configure a first PUCCH resource for a HARQ-ACK transmission, for example PUCCH resource #0. The first PUCCH resource may be selected from at least one PUCCH resource or at least one PUCCH resource set configured via DCI and RRC configuration, and may be determined based on the UCI bit number for the HARQ-ACK transmission and the UCI payload range of the PUCCH resource. The method for allocating a PUCCH resource to a HARQ-ACK and CSI transmission may also configure a second PUCCH resource for a CSI transmission, for example PUCCH resource #2. The second PUCCH resource may be determined based on the RRC configuration.

As shown in step 202, it is first determined whether the HARQ-ACK transmission overlaps with the CSI transmission. For example, such transmissions may overlap each other in situations when the HARQ-ACK transmission fully or partially overlaps with the CSI transmission in the time domain. For example, in an embodiment of the present disclosure, the starting position of the HARQ-ACK transmission and the CSI transmission is identified and in response to the HARQ-ACK transmission and the CSI transmission have the same starting position in the time domain, it is determined that the HARQ-ACK transmission overlaps with the CSI transmission in the time domain, which may be fully or partially overlapped.

In step 204, in response to HARQ-ACK transmission found to overlap with the CSI transmission in the time domain, it is further determined whether the sum of the UCI bits for the HARQ-ACK transmission and the UCI bits for the CSI transmission is within a UCI payload threshold supported by at least one PUCCH resource or at least one PUCCH resource set configured for the HARQ-ACK transmission.

In step 206, a PUCCH resource is allocated to the HARQ-ACK and the CSI transmissions based on whether the sum of the UCI bits for the HARQ-ACK transmission and the UCI bits for the CSI transmission is within a UCI payload threshold supported by the at least one PUCCH resource or at least one PUCCH resource set configured for the HARQ-ACK transmission.

Specifically, in some cases of the present disclosure, it is determined that the sum of the UCI bits for the HARQ-ACK transmission and the UCI bits for the CSI transmission is within a UCI payload threshold supported by the at least one PUCCH resource or at least one PUCCH resource set configured for the HARQ-ACK transmission. In response, all the UCI bits for the HARQ-ACK transmission and CSI transmission may be mapped to the original PUCCH resource determined/configured for the HARQ-ACK transmission, for example the first PUCCH resource—PUCCH resource #0. That is, the original PUCCH resource determined/configured for the HARQ-ACK transmission, as shown in step 206*a*, is allocated to both the HARQ-ACK transmission and the CSI transmission. Both the HARQ-ACK transmission and the CSI transmission are performed on the original PUCCH resource determined/configured for the HARQ-ACK transmission. The format of the allocated PUCCH resource follows the original PUCCH resource determined/configured for the HARQ-ACK transmission.

In some cases of the present disclosure, it is determined that the sum of the UCI bits for the HARQ-ACK transmission and the UCI bits for the CSI transmission exceeds the UCI payload threshold supported by the at least one PUCCH resource or at least one PUCCH resource set configured for the HARQ-ACK transmission. That is, none of the at least one PUCCH resource or none of the at least one PUCCH resource set configured for the HARQ-ACK transmission can support a UCI payload range that can accommodate the total of UCI bits for the HARQ-ACK and CSI transmission. In response to that, the UCI bits for the HARQ-ACK transmission and the UCI bits for the CSI transmission may be mapped to the original PUCCH resource configured for the CSI transmission, for example, the second PUCCH resource—PUCCH resource #2, based on a predefined priority order as shown in step 206*b*. That is, the original PUCCH resource determined/configured for the CSI transmission is allocated to both the HARQ-ACK transmission and CSI transmission. The format of the allocated PUCCH resource follows the original PUCCH resource determined/configured for the CSI transmission.

In an embodiment of the present disclosure, the UCI bits with the highest priority for HARQ-ACK transmission or CSI transmission are firstly mapped into the original PUCCH resource configured for the CSI transmission, while the UCI bits with a lower priority for HARQ-ACK transmission or CSI transmission are successively mapped into the original PUCCH resource configured for the CSI transmission in the predefined priority order until the original PUCCH resource configured for the CSI transmission is fully mapped by the UCI bits. That is, mapping the UCI bits to the original PUCCH resource configured for the CSI transmission from the highest priority to the lowest priority. In some cases, the original PUCCH resource configured for the CSI transmission may not accommodate all the UCI bits for the HARQ-ACK transmission and CSI transmission. In response to that, the UCI bits with a lower priority may be dropped and not be mapped to the original PUCCH resource configured for the CSI transmission. Thus, the UCI bits with higher priority will be ensured to be transmitted.

In other embodiments of the present disclosure, allocating a PUCCH resource to the HARQ-ACK transmission and the CSI transmission may adopt different measures.

Figure 3:
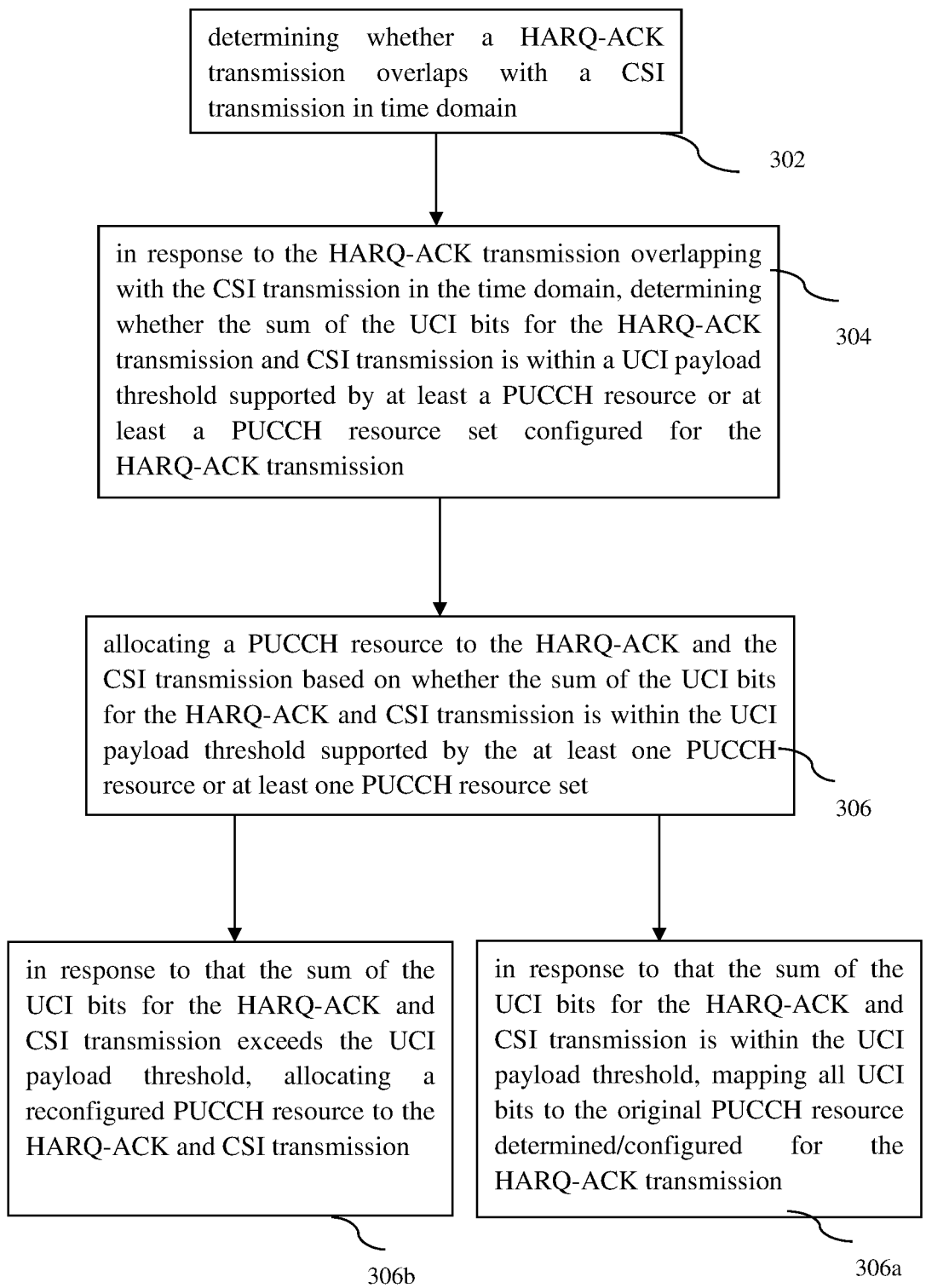
FIG. 3 is a flow chart illustrating a method for allocating a PUCCH resource to a HARQ-ACK and CSI transmission according to another embodiment of the present disclosure.

FIG. 3 is a flow chart illustrating a method for allocating a PUCCH resource to a HARQ-ACK and CSI transmission according to another embodiment of the present disclosure, which can be applied in the application scenario shown in FIG. 1.

Similarly, according to an embodiment of the present disclosure, a method for allocating a PUCCH resource to a HARQ-ACK and CSI transmission may configure a first PUCCH resource for a HARQ-ACK transmission, for example PUCCH resource #0. The first PUCCH resource may be selected from at least one PUCCH resource or at least one PUCCH resource set configured via DCI and RRC configuration, and may be determined based on the UCI bit number for the HARQ-ACK transmission and the UCI payload range of the PUCCH resource. The method for allocating a PUCCH resource to a HARQ-ACK and CSI transmission may also configure a second PUCCH resource for a CSI transmission, for example PUCCH resource #2. The second PUCCH resource may be determined based on the RRC configuration.

As shown in step 302, it is determined whether the HARQ-ACK transmission overlaps with the CSI transmission in time domain. For example, such transmissions may overlap each other in situations when the HARQ-ACK transmission fully or partially overlaps with the CSI transmission in the time domain. For example, in an embodiment of the present disclosure, the starting position of the HARQ-ACK transmission and the CSI transmission is identified and in response to the HARQ-ACK transmission and the CSI transmission have the same starting position in the time domain, it is determined that the HARQ-ACK transmission overlaps with the CSI transmission in the time domain, which may be fully or partially overlapped.

In step 304, in response to the HARQ-ACK transmission found to overlap with the CSI transmission in time domain, whether the sum of the UCI bits for the HARQ-ACK transmission and the UCI bits for the CSI transmission is within a UCI payload threshold supported by at least one PUCCH resource or at least one PUCCH resource set configured for the HARQ-ACK transmission is determined.

In step 306, a PUCCH resource is allocated to the HARQ-ACK transmission and the CSI transmission based on whether the sum of the UCI bits for the HARQ-ACK transmission and the UCI bits for the CSI transmission is within a UCI payload threshold supported by the at least one PUCCH resource or at least one PUCCH resource set configured for the HARQ-ACK transmission.

Specifically, in some cases of the present disclosure, it is determined that the sum of the UCI bits for the HARQ-ACK transmission and the UCI bits for the CSI transmission is within a UCI payload threshold supported by the at least one a PUCCH resource or at least one PUCCH resource set configured for the HARQ-ACK transmission. In response, all the UCI bits for the HARQ-ACK transmission and CSI transmission may be mapped to the original PUCCH resource determined/configured for the HARQ-ACK transmission, for example the first PUCCH resource—PUCCH resource #0. That is, the original PUCCH resource determined/configured for the HARQ-ACK transmission, as shown in step 306*a*, is allocated to both the HARQ-ACK transmission and the CSI transmission. Both the HARQ-ACK transmission and the CSI transmission are performed on the original PUCCH resource determined/configured for the HARQ-ACK transmission. The format of the allocated PUCCH resource also follows the original PUCCH resource determined/configured for the HARQ-ACK transmission.

In some cases of the present disclosure, it is determined that the sum of the UCI bits for the HARQ-ACK transmission and the UCI bits for the CSI transmission exceeds the UCI payload threshold supported by the at least one PUCCH resource or at least one PUCCH resource set configured for the HARQ-ACK transmission. That is, none of the at least one PUCCH resource or none of the at least one resource set configured for the HARQ-ACK transmission can support a UCI payload range that can accommodate a total of UCI bits for the HARQ-ACK and CSI transmission. In response, the UCI bits for the HARQ-ACK transmission and the UCI bits for the CSI transmission may be mapped to a reconfigured PUCCH resource as shown in step 306b. That is, a reconfigured PUCCH resource is allocated to the HARQ-ACK transmission and CSI transmission. The reconfigured PUCCH resource has parameters derived from at least two of PUCCH RRC configuration for HARQ-ACK, PUCCH resource RRC configuration for CSI report, and DCI. The format of the allocated PUCCH resource is determined based on the parameters from at least one of the PUCCH resource RRC configuration for HARQ-ACK, PUCCH resource RRC configuration for CSI report, and the DCI.

For example, the reconfigured PUCCH resource may have parameters derived from PUCCH RRC configuration for HARQ-ACK and PUCCH resource RRC configuration for CSI report, have parameters derived from PUCCH RRC configuration for HARQ-ACK and DCI, have parameters derived from PUCCH resource RRC configuration for CSI report and DCI, or have parameters derived from PUCCH RRC configuration for HARQ-ACK, PUCCH resource RRC configuration for CSI report, and DCI. The format of the allocated PUCCH resource may be determined based on the PUCCH resource RRC configuration for HARQ-ACK, PUCCH resource RRC configuration for CSI report, or the DCI.

More specifically, in an embodiment of the disclosure, for the reconfigured PUCCH resource, the time and/or frequency domain starting position etc. parameters may be determined by PDSCH-to-HARQ feedback timing indicator and/or ARI and/or CCE-based-index in DCI, while the time domain duration, frequency resource amount and location relative to the starting position etc. parameters may follow the PUCCH resource RRC configuration for CSI report. The format of the reconfigured PUCCH resource may also follow the PUCCH resource RRC configuration for CSI report.

Since the reconfigured PUCCH resource for the HARQ-ACK transmission and CSI transmission can accommodate the total UCI bits for the HARQ-ACK and CSI transmission, DCI miss detection ambiguity can be avoided in the network side. That is, the blind decoding in the network side, for example in the base station is allowable.

In some embodiments of the present disclosure, the HARQ-ACK transmission partially overlaps with the CSI transmission. For example, the HARQ-ACK transmission and the CSI transmission are overlapped, while they have different starting positions in the time domain. Besides the embodiments of the present disclosure illustrated above, according to another embodiment of the disclosure, the allocated PUCCH resource may be the original PUCCH resource configured for the later one of the HARQ-ACK transmission and the CSI transmission, for example, the first PUCCH resource later than the second PUCCH resource or the second PUCCH resource later than the first PUCCH resource.

Specifically, in an example of the present disclosure, it is determined that the HARQ-ACK transmission overlaps with the CSI transmission, while they have different starting positions in the time domain. For example, in one embodiment, the HARQ-ACK transmission starts later than the CSI transmission, whereas in another embodiment, the CSI transmission starts later than the HARQ-ACK transmission. It is also determined that the sum of the UCI bits for the HARQ-ACK transmission and the UCI bits for the CSI transmission exceeds the UCI payload threshold supported by the at least one PUCCH resource or at least one PUCCH resource set configured for the HARQ-ACK transmission. That is, none of the at least one PUCCH resource or none of the at least one PUCCH resource set configured for the HARQ-ACK transmission can support the UCI payload range that accommodates all of the UCI bits for the HARQ-ACK and CSI transmission. In response, the PUCCH resource originally configured for the transmission that starts at a later time may be allocated to the HARQ-ACK and CSI transmission. The format of the allocated PUCCH resource also follows the original PUCCH resource configured for the later transmission i.e., the first PUCCH resource.

In some embodiments of the present disclosure, the SR transmission may also overlaps with the HARQ-ACK transmission and CSI transmission. The SR transmission may be firstly multiplexed with the HARQ-ACK transmission in the PUCCH resource. In this case, the HARQ-ACK transmissions described in the embodiments of the present disclosure also include the HARQ-ACK transmissions multiplexed with the SR transmission.

The method of the present disclosure can be implemented on an apparatus, a programmed processor, or an apparatus with at least one programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in FIGS. 2 and 3 may be used to implement the processor functions of this disclosure.

For example, in an embodiment of the present disclosure, an apparatus, which may be a user equipment (UE), also known as a mobile device, may include a processor and at least one memory including computer program codes. The at least one memory and the computer program codes are configured to, with the at least one processor, cause the apparatus to perform methods for allocating PUCCH resources for HARQ ACK and CSI transmission. The apparatus, for example, an UE may further include a receiver, which is configured to receive signaling or data/information etc. from the network side. The apparatus, for example, an UE may further include a transmitter, which is configured to transmit the HARQ-ACK and CSI transmission on the allocated PUCCH resource or other data/information etc.

According to an alternative embodiment, computer executable instructions implementing the methods according to embodiments of the present application are stored in a non-transitory, computer-readable storage medium. The instructions are preferably executed by computer-executable components preferably integrated with a wireless communication system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each FIG. are not necessary for operation of the disclosed embodiments. For example, persons of ordinary skill in the art of the disclosed embodiments would be enabled to make use of the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

What is claimed:

1. A method, comprising:
   determining whether a hybrid automatic repeat request-acknowledgement transmission overlaps with a channel state information transmission in time domain;
   in response to the hybrid automatic repeat request-acknowledgement transmission overlapping with the channel state information transmission in the time domain, determining whether a sum of uplink control information bits for the hybrid automatic repeat request-acknowledgement transmission and uplink control information bits for the channel state information transmission is within a uplink control information payload threshold supported by at least one physical uplink control channel resource or at least one physical uplink control channel resource set configured for the hybrid automatic repeat request-acknowledgement transmission; and
   allocating a physical uplink control channel resource to the hybrid automatic repeat request-acknowledgement transmission and the channel state information transmission in response to the sum of the uplink control information bits for the hybrid automatic repeat request-acknowledgement transmission and the uplink control information bits for the channel state information transmission exceeding the uplink control information payload threshold supported by the at least one physical uplink control channel resource or the at least one physical uplink control channel resource set, wherein;
   in response to the physical uplink channel control resource comprising an original physical uplink channel control resource, lower priority bits of the uplink control information bits for the hybrid automatic repeat request-acknowledgement transmission and lower priority bits of the uplink control information bits for the channel state information transmission that exceed the uplink control information threshold are selected to be not transmitted in the original physical uplink control channel resource.

2. The method according to claim 1, wherein determining whether the hybrid automatic repeat request-acknowledgement transmission overlaps with the channel state information transmission in the time domain further comprises determining whether the hybrid automatic repeat request-acknowledgement transmission and the channel state information transmission have the same starting position in the time domain.

3. The method according to claim 2, wherein in response to the hybrid automatic repeat request-acknowledgement transmission and the channel state information transmission overlapping and having different starting positions in the time domain, the allocated physical uplink control channel resource is the original physical uplink control channel resource configured for a later one of the hybrid automatic repeat request-acknowledgement transmission and the channel state information transmission.

4. The method according to claim 1, wherein the uplink control information payload threshold is the maximum of uplink control information payload ranges supported by the at least one physical uplink control channel resource or the at least one physical uplink control channel resource set configured for the hybrid automatic repeat request-acknowledgement transmission.

5. The method according to claim 1, further comprising mapping the uplink control information bits for the hybrid automatic repeat request-acknowledgement transmission and the uplink control information bits for the channel state information transmission to the original physical uplink control channel resource configured for the channel state information transmission based on a predefined priority order.

6. The method according to claim 5, wherein mapping the uplink control information bits for the hybrid automatic repeat request-acknowledgement transmission and the uplink control information bits for the channel state information transmission to the original physical uplink control channel resource configured for the channel state information transmission further comprises dropping uplink control information bits with a first priority in response to the original physical uplink control channel resource being fully mapped by the uplink control information bits with a second priority higher than the first priority.

7. The method according to claim 1, wherein a reconfigured physical uplink control channel resource has parameters derived from at least two of physical uplink control channel resource radio resource control configuration for hybrid automatic repeat request-acknowledgement, physical uplink control channel resource radio resource control configuration for channel state information report, and downlink control information.

8. The method according to claim 7, wherein a format of the reconfigured physical uplink control channel resource is determined based on the parameters from at least one of the physical uplink control channel resource radio resource control configuration for hybrid automatic repeat request-acknowledgement, physical uplink control channel resource radio resource control configuration for channel state information report, and the downlink control information.

9. The method according to claim 7, further comprising mapping the uplink control information bits for the hybrid automatic repeat request-acknowledgement transmission and the uplink control information bits for the channel state information transmission to the reconfigured physical uplink control channel resource.

10. The method according to claim 1, wherein the at least one physical uplink control channel resource or the at least one physical uplink control channel resource set configured for the hybrid automatic repeat request-acknowledgement transmission is determined based on downlink control information and radio resource control configuration.

11. The method according to claim 1, wherein the original physical uplink control channel resource configured for the channel state information transmission is determined based on radio resource control configuration.

12. The method according to claim 1, further comprising in response to the sum of the uplink control information bits for the hybrid automatic repeat request-acknowledgement transmission and the uplink control information bits for the channel state information transmission being within the uplink control information payload threshold, mapping the uplink control information bits for the hybrid automatic repeat request-acknowledgement transmission and the uplink control information bits for the channel state information transmission to the original physical uplink control channel resource configured for the hybrid automatic repeat request-acknowledgement transmission.

13. An apparatus, comprising:
 at least one processor; and
 at least one memory including computer program instructions stored therein; wherein the at least one memory and the computer program instructions are configured to, with the at least one processor, cause the apparatus to perform:
 determining whether a hybrid automatic repeat request-acknowledgement transmission overlaps with a channel state information transmission in time domain;
 in response to that the hybrid automatic repeat request-acknowledgement transmission overlaps with the channel state information transmission in the time domain, determining whether a sum of uplink control information bits for the hybrid automatic repeat request-acknowledgement transmission and uplink control information bits for the channel state information transmission is within a uplink control information payload threshold supported by at least one physical uplink control channel resource or at least one physical uplink control channel resource set configured for the hybrid automatic repeat request-acknowledgement transmission; and
 allocating a physical uplink control channel resource to the hybrid automatic repeat request-acknowledgement transmission and the channel state information transmission in response to the sum of the uplink control information bits for the hybrid automatic repeat request-acknowledgement transmission and the uplink control information bits for the channel state information transmission exceeding the uplink control information payload threshold supported by the at least one physical uplink control channel resource or the at least one physical uplink control channel resource set, wherein:
 in response to the physical uplink control channel resource comprises comprising an original physical uplink control channel resource, lower priority bits of the uplink control information bits for the hybrid automatic repeat request-acknowledgement transmission and lower priority bits of the uplink control information bits for the channel state information transmission that exceed the uplink control information threshold are selected to be not transmitted in the original physical uplink control channel resource.

14. The apparatus according to claim 13, wherein determining whether the hybrid automatic repeat request-acknowledgement transmission overlaps with the channel state information transmission in the time domain further comprises determining whether the hybrid automatic repeat request-acknowledgement transmission and the channel state information transmission have the same starting position in the time domain.

15. The apparatus according to claim 13, wherein the uplink control information payload threshold is the maximum of uplink control information payload ranges supported by the at least one physical uplink control channel resource or the at least one physical uplink control channel resource set configured for the hybrid automatic repeat request-acknowledgement transmission.

16. The apparatus according to claim 14, wherein the apparatus is further caused to perform mapping the uplink control information bits for the hybrid automatic repeat request-acknowledgement transmission and the uplink control information bits for the channel state information transmission to the original physical uplink control channel resource configured for the channel state information transmission based on a predefined priority order.

17. The apparatus according to claim 16, wherein mapping the uplink control information bits for the hybrid automatic repeat request-acknowledgement transmission and the uplink control information bits for the channel state information transmission to the original physical uplink control channel resource configured for the channel state information transmission further comprises dropping uplink control information bits with a first priority in response to that the original physical uplink control channel resource is fully mapped by the uplink control information bits with a second priority higher than the first priority.

18. The apparatus according to claim 13, wherein a reconfigured physical uplink control channel resource has parameters derived from at least two of physical uplink control channel resource radio resource control configuration for hybrid automatic repeat request-acknowledgement, physical uplink control channel resource radio resource control configuration for channel state information report, and downlink control information.

\* \* \* \* \*